United States Patent
Fuchida et al.

(10) Patent No.: US 8,963,364 B2
(45) Date of Patent: Feb. 24, 2015

(54) VEHICLE-MOUNTED DEVICE AND KEY SWITCH IDENTIFICATION METHOD

(75) Inventors: Go Fuchida, Yokohama (JP); Kenichi Ohno, Tokorozawa (JP)

(73) Assignee: JVC Kenwood Corporation, Yokohama (JP)

( * ) Notice: Subject to any disclaimer, the term of this patent is extended or adjusted under 35 U.S.C. 154(b) by 524 days.

(21) Appl. No.: 13/314,764

(22) Filed: Dec. 8, 2011

(65) Prior Publication Data

US 2012/0146404 A1 Jun. 14, 2012

(30) Foreign Application Priority Data

Dec. 10, 2010 (JP) .............................. P2010-275788

(51) Int. Cl.
- B60L 1/00 (2006.01)
- B60L 3/00 (2006.01)
- H02G 3/00 (2006.01)
- B60R 16/02 (2006.01)

(52) U.S. Cl.
CPC ..................................... B60R 16/02 (2013.01)
USPC ........................................... 307/9.1; 307/115

(58) Field of Classification Search
CPC ....................................................... B60R 16/02
USPC .......................................................... 341/155
See application file for complete search history.

(56) References Cited

U.S. PATENT DOCUMENTS 7,768,436 B2 * 8/2010 Johnson ........................ 341/155

FOREIGN PATENT DOCUMENTS

| JP | 60058795 A | 4/1985 |
| JP | 63299699 A | 12/1988 |
| JP | 2007-230290 A | 9/2007 |
| JP | 2007-320360 A | 12/2007 |

OTHER PUBLICATIONS

Official Action issued on Jan. 22, 2013, in the counterpart Japanese application No. 2010-275788.

* cited by examiner

*Primary Examiner* — Rexford Barnie
*Assistant Examiner* — Toan Vu
(74) *Attorney, Agent, or Firm* — Nath, Goldberg & Meyer; Jerald L. Meyer; Leonid D. Thenor

(57) ABSTRACT

A voltage detector 22 has an input port IN connectable to a steering remote control 6 of a voltage dividing type adapted to output one of output voltages different from each other for each of key switches to be pressed by a user, and detects through the input port IN an output voltage output from the steering remote control 6. A pull-up resistor 21a is connected in series between the input port IN and a power supply Vdd supplying a voltage to the steering remote control 6, and has a variable resistance. A controller 23 controls the pull-up resistor 21a to have sequentially changed resistances in a course of pressing the key switches. A processor 3 operates on sets of output voltages given respectively for the resistances in the course of pressing the key switches, to select a resistance of the pull-up resistor.

12 Claims, 7 Drawing Sheets

FIG. 8

| CAR MAKERS | | Vdc(V) | SW1 | SW2 | SW3 | SW4 | SW5 | SW6 | SW7 | SW8 | SW9 | SW10 | off |
|---|---|---|---|---|---|---|---|---|---|---|---|---|---|
| A | L1 | | 0.45 | 2.10 | 3.39 | 4.25 | | | | | | | 4.85 |
| A | L2 | | 0.45 | 2.10 | 3.39 | 4.27 | | | | | | | 4.85 |
| B | | | 1.17 | 2.28 | 3.13 | 3.86 | 4.35 | | | | | | 4.66 |
| C | | | 0.87 | 1.44 | 2.10 | 2.78 | 3.42 | 3.99 | | | | | 4.47 |
| D(1) | | | 0.63 | 1.11 | 1.67 | 2.21 | 2.85 | 3.52 | | | | | 4.44 |
| D(2) | L1 | | 1.11 | 1.67 | 2.21 | 2.85 | 3.52 | | | | | | 4.44 |
| D(2) | L2 | | 2.19 | 3.39 | 4.25 | | | | | | | | 4.85 |
| E | | | 0.37 | 0.82 | 1.25 | 1.74 | 2.18 | 2.65 | 3.01 | 3.36 | 3.76 | 4.10 | 4.68 |

VEHICLE-MOUNTED DEVICE AND KEY SWITCH IDENTIFICATION METHOD

CROSS REFERENCE TO RELATED APPLICATION

This application is based on prior Japanese Patent Application No. 2010-275788 (filed Dec. 10, 2010 in Japan). The entire contents of the Japanese Patent Application No. 2010-275788 from which priority is claimed are incorporated herein by reference, in order to take some protection against translation errors or omitted portions.

TECHNICAL FIELD

The present invention relates to a vehicle-mounted device operable by various remote controllers, and a key switch identification method.

BACKGROUND

There are vehicles such as automobiles having a device such as a car navigator or car audio equipment mounted thereon as a vehicle-mounted device of a so-called genuine spec authorized by the car maker. There are vehicles increasing in number, having a remote controller attached to a steering wheel to make a remote control of a genuine vehicle-mounted device. The steering-wheel-mounted remote controller (referred herein to as a steering remote control) is set up for adaptation to control a genuine vehicle-mounted device.

The genuine vehicle-mounted device may be replaced with another vehicle-mountable device generally available in the market. The steering remote control outputs preset signals (with voltage values) commensurate with the genuine vehicle-mounted device. The voltage values may be different between car makers or car types. Therefore, when connected to a commercially available vehicle-mountable device, the steering remote control is unable to work to operate the commercially available vehicle-mountable device as necessary.

To address this point, an adapter is proposed (Japanese Patent Application Laid-Open Publication No. 2007-320360 and No. 2007-230290) which inputs a signal from a steering remote control, converts it into a signal that a vehicle-mounted device can accommodate, and supplies the converted signal to the vehicle-mounted device.

SUMMARY

It is desirable to make a vehicle-mounted device adaptive to be operable with a steering remote control, by a setting at the vehicle-mounted device itself, without relying on such an adapter as disclosed in Japanese Patent Application Laid-Open Publication No. 2007-320360 and No. 2007-230290. Also desirable is a vehicle-mounted device made adaptive by a setting to be accommodative to, and operable with, steering remote controls by different car makers.

It is an object of the present invention to provide a vehicle-mounted device adaptive to be operable with an external remote controller, by a setting at the vehicle-mounted device itself. It is another object to provide a vehicle-mounted device adaptive by a setting to be accommodative to and operable with remote controllers by different car makers. It is still another object to provide a key switch identification method adapted to identify key switches on a remote controller, with reduced identification errors.

To achieve the object, according to a first aspect of the present invention, there is provided a vehicle-mounted device comprising a voltage detector comprising an input port connectable to a remote controller of a voltage dividing type adapted to output one of output voltages different from each other for each of key switches to be pressed by a user, the voltage detector being configured to detect through the input port an output voltage output from the remote controller, a pull-up resistor connected in series between the input port and a power supply supplying a voltage to the remote controller, the pull-up resistor having a variable resistance, a controller configured to control the pull-up resistor to have sequentially changed resistances in a course of pressing the key switches, and a processor configured to select a resistance of the pull-up resistor based on sets of output voltages given respectively for the resistances in the course of pressing the key switches.

According to a second aspect of the present invention, there is provided a key switch identification method comprising detecting, through an input port connected to a remote controller of a voltage dividing type adapted to output one of output voltages different from each other for each of key switches to be pressed by a user, an output voltage output from the remote controller, controlling a pull-up resistor which is connected in series between the input port and a power supply supplying a voltage to the remote controller and has a variable resistance, to have sequentially changed resistances in a course of pressing the key switches, selecting a resistance of the pull-up resistor operating based on sets of output voltages given respectively for the resistances in the course of pressing the key switches, and identifying a pressed key switch based on an output voltage output from the remote controller under a condition that the resistance of the pull-up resistor is selected.

BRIEF DESCRIPTION OF DRAWINGS

FIG. 8 is a table listing arrays of output voltages of steering remote controls that are different among car makers.

DESCRIPTION OF EMBODIMENTS

There will be described first and second embodiments of the present invention with reference to the drawings. The drawings include identical or similar parts designated by identical or similar reference signs. The embodiments are illustrative implementations of a technical concept of the present invention in specific forms including devices and methods, as well as systems using them. The technical concept of the present invention is not restrictive to the embodiments illustrated as devices, methods, or systems. The technical concept of the present invention can be modified in various manners within the scope of claims.

(First Embodiment)

Figure 1:
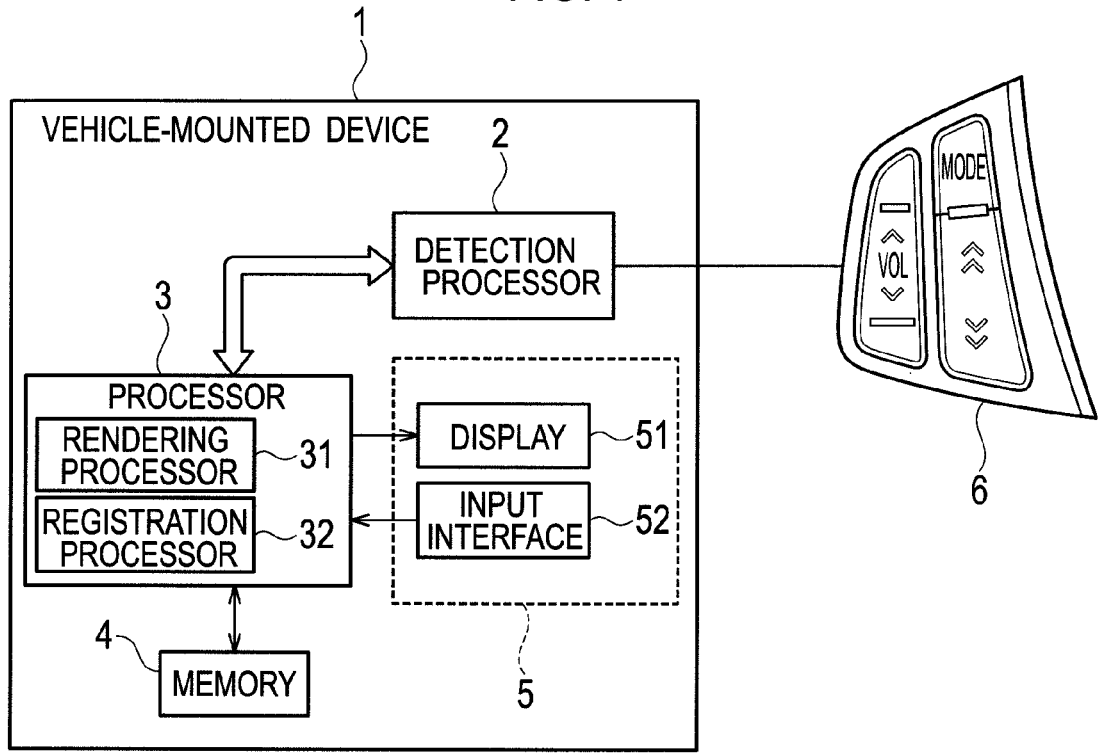
FIG. 1 is a block diagram showing a frame format of a basic configuration of a vehicle-mounted device according to a first embodiment of the present invention.

FIG. 1 shows a vehicle-mounted device 1 according to a first embodiment of the present invention. As shown in FIG. 1, the vehicle-mounted device 1 includes a detection processor 2, a processor 3, a memory 4, and a combination of a display 51 and an input interface 52. The detection processor 2 detects a key switch being pressed at a steering remote control 6. The processor 3 executes various operations to be performed at the vehicle-mounted device 1, and controls the vehicle-mounted device 1. The memory 4 stores therein various data, programs, and the like. The vehicle-mounted device 1 may be a car navigation system, a car audio or video device, or the like installed in a vehicle (not shown).

Figure 2:
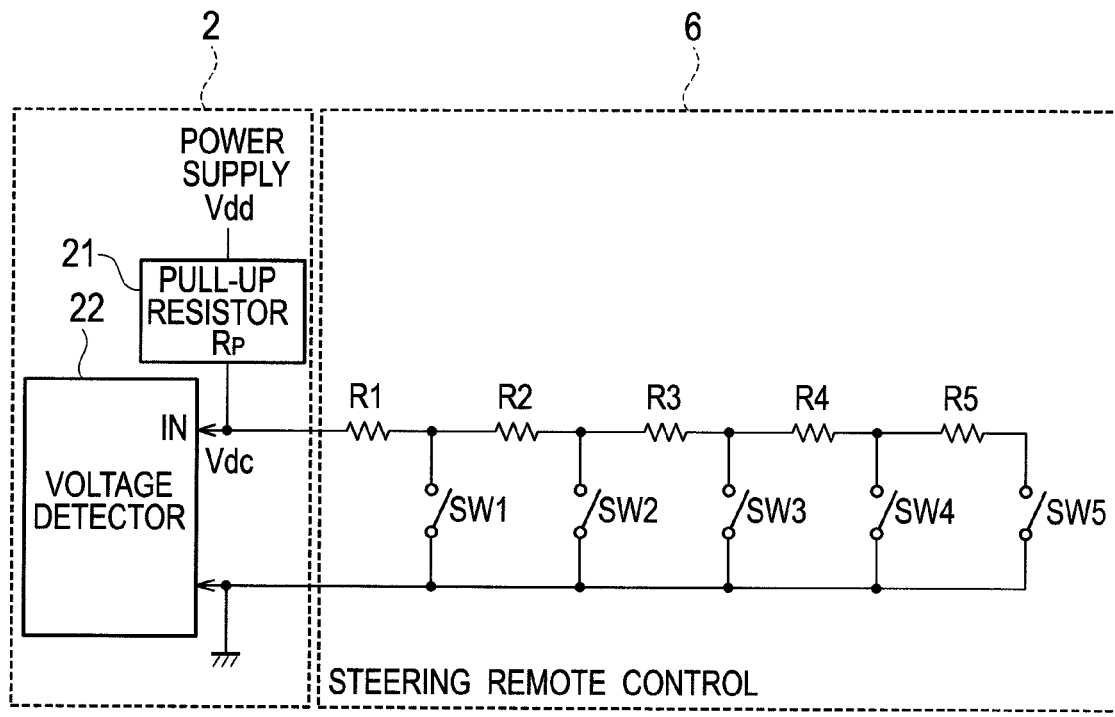
FIG. 2 is a circuit diagram covering a steering remote control and a detection processor of the vehicle-mounted device according to the first embodiment.

The steering remote control 6 is furnished as a remote controller on a steering wheel (not shown) of the vehicle, to output to the vehicle-mounted device 1 a signal for operating the vehicle-mounted device 1. The steering remote control 6 is configured as a remote controller of a voltage dividing type using a ladder circuit including, for instance, as shown in FIG. 2, an array of resistors R1 to R5 provided with key switches SW1 to SW5, respectively. The steering remote control 6 is adapted, every time when any key switch is pressed, to output to the detection processor 2 in the vehicle-mounted device 1 a corresponding one of different output voltages Vdc based on a voltage input from a power supply Vdd of the vehicle-mounted device 1.

The detection processor 2 includes a pull-up resistor 21, and a voltage detector 22. The voltage detector 22 detects an output voltage Vdc output from the steering remote control 6 and input to an input port IN of the voltage detector 22. The pull-up resistor 21 is connected in series between the power supply Vdd and the input port IN.

The output voltage Vdc input to the input port IN of the voltage detector 22 is stable by virtue of the pull-up resistor 21, even in the off state in which the key switches SW1 to SW5 are all open. The steering remote control 6 has an output voltage Vdc when it is off with no pressed key switches. When any key switch is pressed, the steering remote control 6 has one of output voltages Vdc preset to the key switches SW1 to SW5. The output voltages Vdc are different from each other. The pull-up resistor 21 has a resistance $R_p$ set to be optimal for the voltage detector 22 to adequately detect an output voltage Vdc even when any key switch is pressed among the key switches SW1 to SW5.

Figure 3:
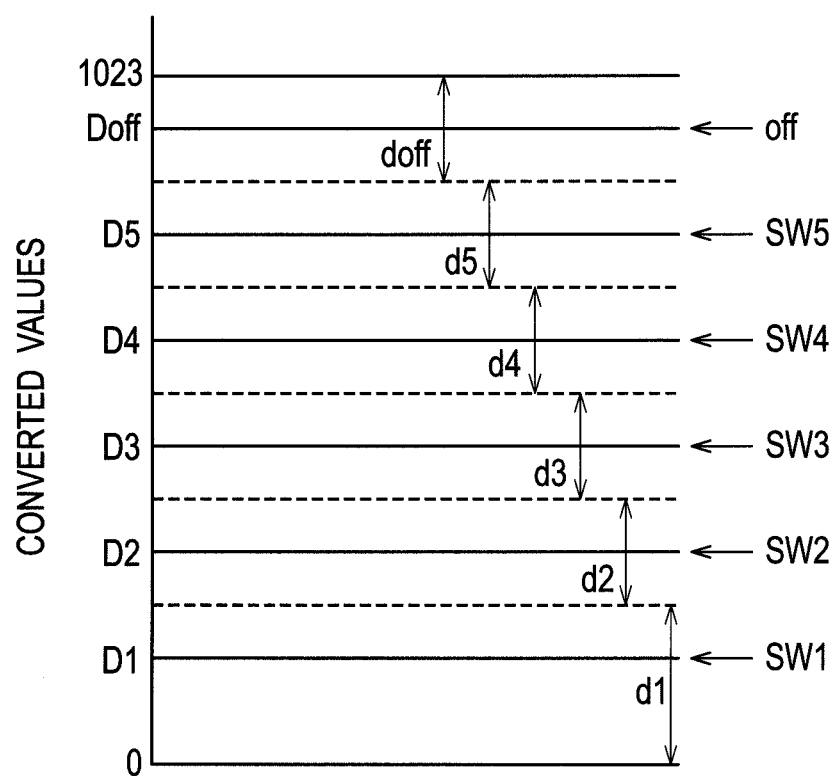
FIG. 3 is an illustration describing a method of detecting output signals of the steering remote control at the vehicle-mounted device according to the first embodiment.

The voltage detector 22 is operated periodically or with a changed input as a trigger, to read the input port IN, detecting an output voltage Vdc input thereto. The voltage detector 22 makes an A-D conversion for converting the input analog voltage into a digital value. For instance, as illustrated in FIG. 3, the voltage detector 22 is adapted to make conversions as follows. When any key switch is pressed among SW1 to SW5, its output voltage Vdc is converted into one of ten-bit converted values D1 to D5. During the off state having no pressed key switches, its output voltage Vdc is converted into a ten-bit converted value Doff. The converted value being one of D1 to D5 or Doff is output to the processor 3.

The processor 3 is adapted to input the converted value being one of D1 to D5 output from the voltage detector 22, and identify which key switch is pressed among SW1 to SW5, to make the vehicle-mounted device 1 execute its executable function to which the pressed key switch is assigned. The processor 3 includes a rendering processor 31, and a registration processor 32. The rendering processor 31 is responsible for control to render various data on the display 51. The registration processor 32 is adapted to store assignments of key switches in the memory 4, to register functions of the key switches. The processor 3 may be made by a microcomputer.

FIG. 3 shows a converted value range 'doff', and converted value ranges d1 to d5 to be preset. During the off state, its output voltage Vdc is converted within the converted value range 'doff'. When any key switch is pressed, its output voltage Vdc is converted within one of the converted value ranges d1 to d5. For instance, when a certain key switch is pressed at the steering remote control 6, if its output voltage Vdc has a converted value within a range d3 including the converted value D3, this converted value D3 is input to the processor 3. The processor 3 determines that the pressed key switch is SW3. The ranges d1 to d5 and 'doff' may be defined as necessary with boundaries in upper and lower regions of the converted values D1 to D5 and Doff, respectively. If neighboring key switches have close converted values when pressed, their ranges may be defined with a boundary at the midpoint.

The memory 4 is adapted to store therein a series of programs and the like, as necessary for the vehicle-mounted device 1 to execute processes, affording to use as temporary storage areas and the like, as necessary for execution of processes. The memory 4 may be a main memory composed of a volatile memory, for instance, an SRAM or DRAM, or an auxiliary memory composed of a non-volatile memory, for instance, a magnetic disc such as a hard disc (HD), a magnetic tape, an optical disc, or a magnet-optical disc. The auxiliary memory used may be a RAM disc, an IC card, a flash memory card, a USB flash memory, a flash disc (SSD), etc.

The display 51 may be an arbitrary display device. The input interface 52 may be composed of a set of input devices such as various switches or connectors or the like adapted to input signals output from external devices. The display 51 and the input interface 52 may be combined with each other to provide a touch panel. The first embodiment has a touch panel 5 including the display 51 and the input interface 52.

<Key Switch Assigning Method>

Figure 4:
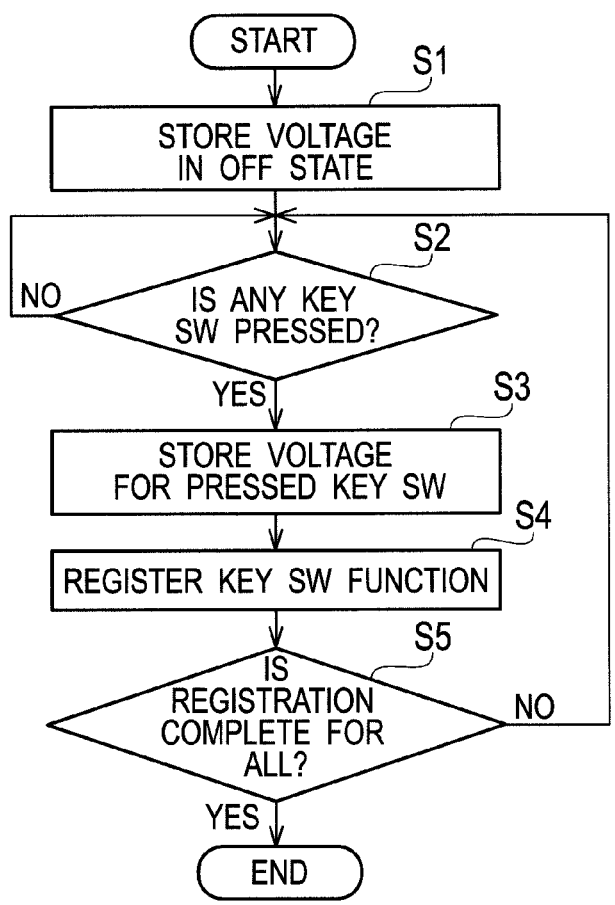
FIG. 4 is a flowchart showing a method of assigning key switches according to the first embodiment.

Description is now made of a key switch assigning method with reference to a flowchart in FIG. 4. This method assigns functions of controlling operations of the vehicle-mounted device 1 to the key switches on the steering remote control 6.

First, at a step S1, the voltage detector 22 detects an output voltage Vdc of the steering remote control 6 when it is off with no pressed key switches, and outputs a converted value of the detected voltage Vdc to the processor 3. At the processor 3, the registration processor 32 is operated to store in the memory 4 the converted value as a data representative of the output voltage Vdc the voltage detector 22 has detected in the off state.

At a step S2, the processor 3 is shifted from a normal mode to a registration mode by a user's operation to the touch panel 5. Then, the processor 3 determines which key switch is pressed among SW1 to SW5 on the steering remote control 6, depending on the variation of a converted value representative of an output voltage Vdc the voltage detector 22 has detected.

Figure 5:
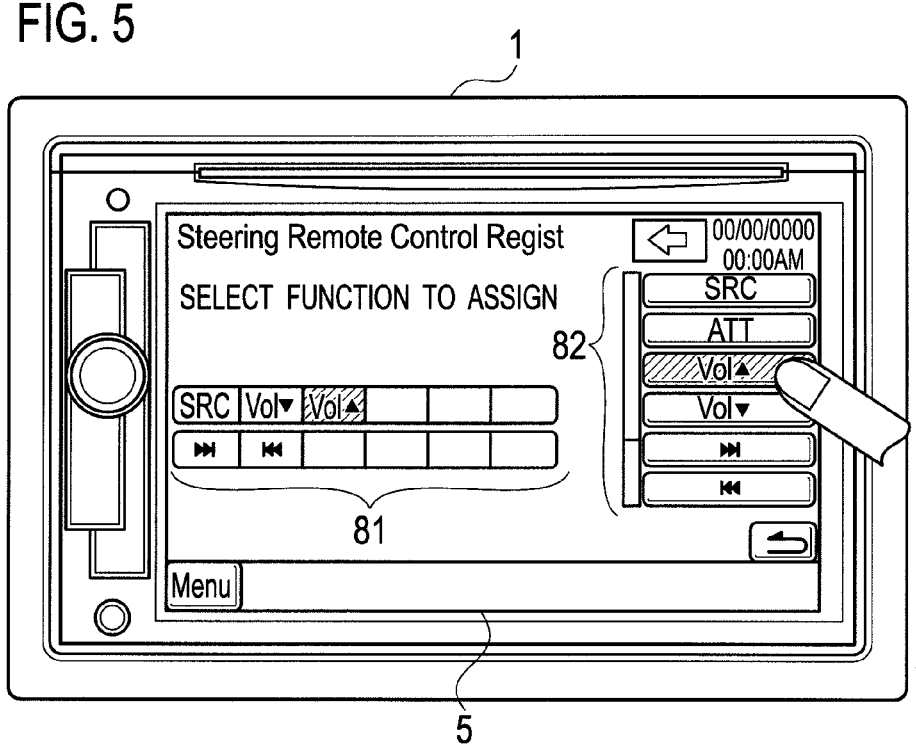
FIG. 5 is an illustration of a touch panel for explanation of the key assigning method according to the first embodiment.

The determination that any key switch is pressed among SW1 to SW5 is followed by a step S3, where the registration processor 32 is operated to store in the memory 4 a converted value as a data representative of the output voltage Vdc the voltage detector 22 has detected when the key switch is pressed. For instance, in a situation any key switch is pressed among SW1 to SW5, in a continued manner for a prescribed time (e.g. one or two seconds), the registration processor 32 is operated to store in the memory 4 a converted value representative of an output voltage Vdc when the key switch is pressed. As illustrated in FIG. 5, the rendering processor 31 is adapted to render on the touch panel 5 a key switch display region 81 composed of sub-regions arrayed in part of a display screen of the touch panel 5, highlighting a sub-region. The key switch display region 81 has a number of sub-regions equal to or greater than the number of key switches on the steering remote control 6. The registration processor 32 may be responsive to a situation in which no key switches are pressed for a prescribed time, to enter an operation when any key switch is pressed thereafter, to store in the memory 4 a converted value representative of an output voltage Vdc when the key switch is pressed.

At a step S4, the registration processor 32 is operated in accordance with a user's instruction to register a function that the vehicle-mounted device 1 can execute, in association with the converted value representative of the output voltage Vdc when the key switch referred to at the step S2 was pressed. As illustrated in FIG. 5, the rendering processor 31 is adapted to render a list of functions the vehicle-mounted device 1 can execute, in a function display region 82 that is part of the display screen of the touch panel 5. The function display region 82 has an array of sub-regions displaying functions. The user can select a function on any sub-region by an input action thereto, whereby the function is identified on the touch panel 5 to designate in the processor 3. The registration processor 32 is then operated to store and register in the memory 4 the function to be assigned to the key switch pressed at the step S2. The rendering processor 31 is adapted to render a name of the function thus registered on the sub-region highlighted in the key switch display region 81 at the previous step S3. Accordingly, the user can take a look on a set of functions registered as assigned to key switches on the steering remote control 6. The function display region 82 may have many function items to be displayed, and is adapted for a scrolling or the like to display a list of functions.

At a step S5, the processor 3 determines whether or not the registration is complete with respect to functions to be associated with key switches on the steering remote control 6. If the registration is determined to be yet incomplete, the processor 3 again goes to the step S2. When the registration is determined to be complete, the processor 3 ends the registration mode, and shifts to the normal mode. At the step S5, the determination above may depend on a user's operation to the touch panel 5.

In the normal mode, the processor 3 is responsive to any converted value input thereto from the voltage detector 22 that is determined as a converted value representative of a voltage stored in the memory 4 at the step S3, to execute a function registered at the step S4 in association with the converted value representative of the voltage stored in the memory 4 at the step S3.

According to the first embodiment, a vehicle-mounted device is adapted to store in a memory an output voltage of a steering remote control, for each of key switches therein, and make identification of the key switches, thereby allowing for facilitated operations of various steering remote controls irrespective of the car makers or the car types.

Moreover, according to the first embodiment, a vehicle-mounted device is adapted to freely assign a function to each of key switches on a steering remote control that may be different in configuration or key switch arrangement.

Further, according to the first embodiment, a vehicle-mounted device is adapted in a registration mode to be responsive to a situation in which a key switch in a steering remote control is continually pressed for a prescribed time, to enter an operation for storing in a memory a converted value representative of an output voltage while the key switch is pressed. This permits a prevention of noises such as chattering, allowing for an enhanced precision in output voltage detection.

It is noted that FIG. 1 illustrates logical configurations such as those of a processor 3 and a memory 4. In practice, they may be built in an operational processor as common hardware, or may be configured as separate hardware.

(Second Embodiment)

Figure 6:
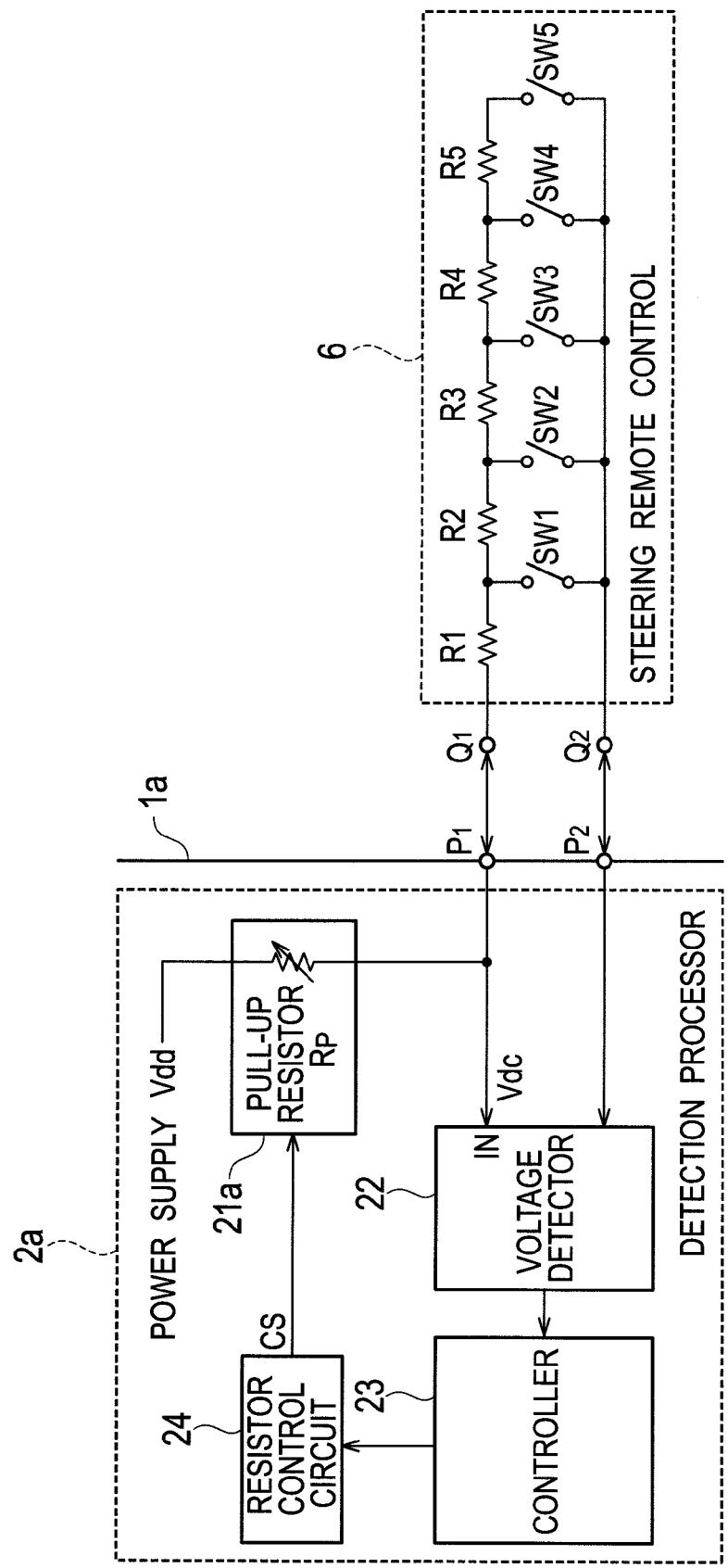
FIG. 6 is a circuit diagram showing a basic configuration of a vehicle-mounted device according to a second embodiment of the present invention.

FIG. 6 shows a vehicle-mounted device 1a according to a second embodiment of the present invention, which has a detection processor 2a substituting for the detection processor 2 in FIG. 1. As shown in FIG. 6, the detection processor 2a has a pull-up resistor 21a variable in resistance. The vehicle-mounted device 1a according to the second embodiment differs from the vehicle-mounted device 1 according to the first embodiment in that the pull-up resistor 21a can have a resistance changed by a steering remote control, as necessary, for detection of an output voltage of the steering remote control. The second embodiment includes constituent elements that are not described, which are substantially identical to the first embodiment, so redundant description is omitted.

Figure 7A:
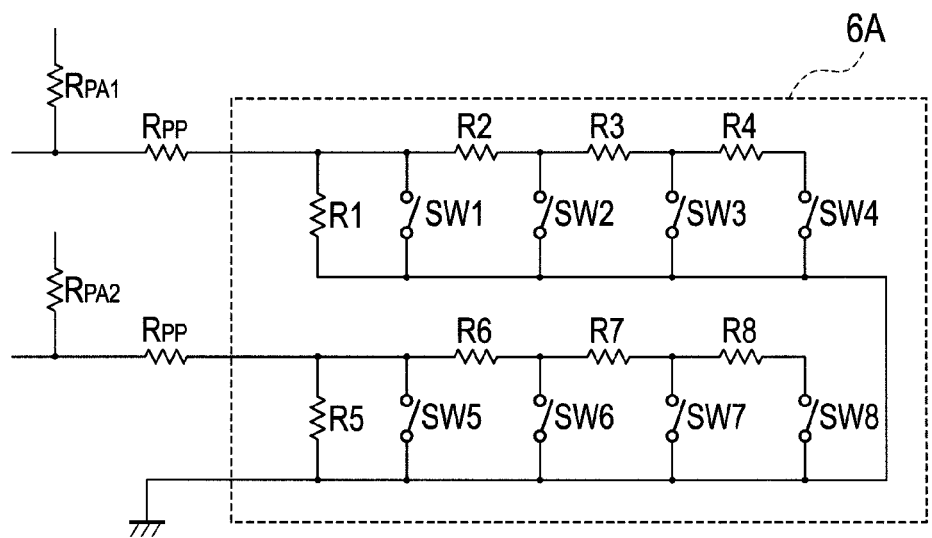
FIG. 7 is a combination of circuit diagrams for explanation of steering remote controls of car makers having different configurations.
Figure 7B:
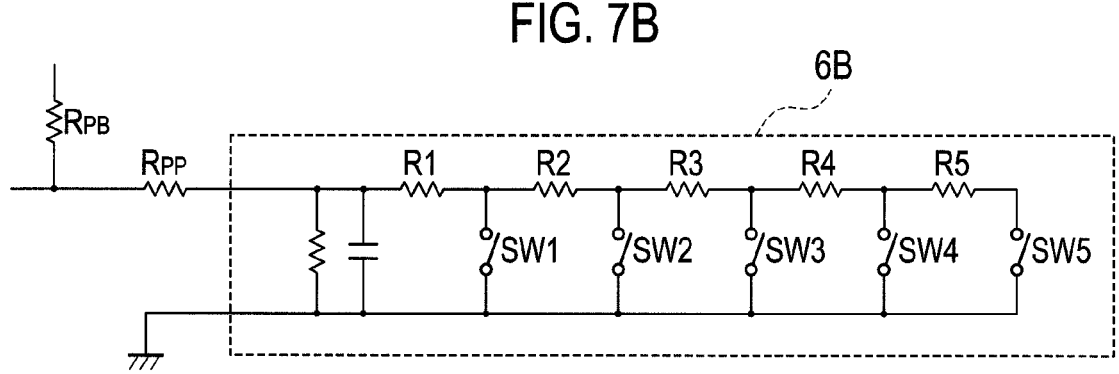
Figure 7C:
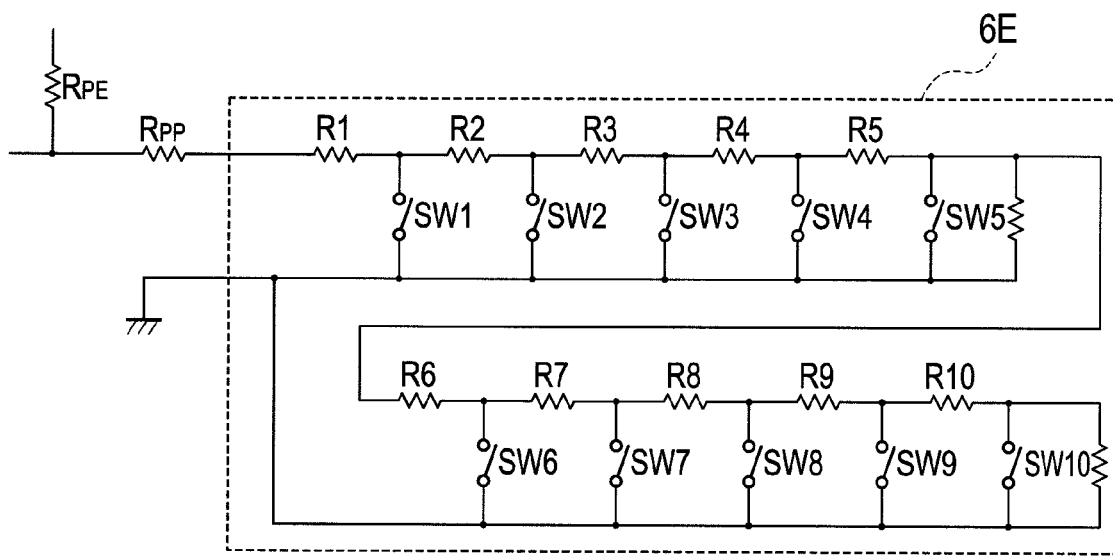

FIGS. 7A to 7C illustrate steering remote controls 6A, 6B, and 6E which are different from each other in circuit configuration. FIG. 8 is a table listing steering remote controls having different key switch numbers, resistances, and output voltages, as the car marker and the car type are different.

In the vehicle-mounted device 1a, as shown in FIG. 6, the detection processor 2a includes the pull-up resistor 21a, a voltage detector 22, a controller 23, and a resistor control circuit 24. The resistor control circuit 24 is operative to output to the pull-up resistor 21a a control signal CS for controlling the pull-up resistor 21a to change its resistance $R_p$. The controller 23 is operative to input from the voltage detector 22 a converted value representative of an output voltage Vdc the voltage detector 22 has detected, and control operations of the resistor control circuit 24. The controller 23 may be a microcomputer.

Figure 9:
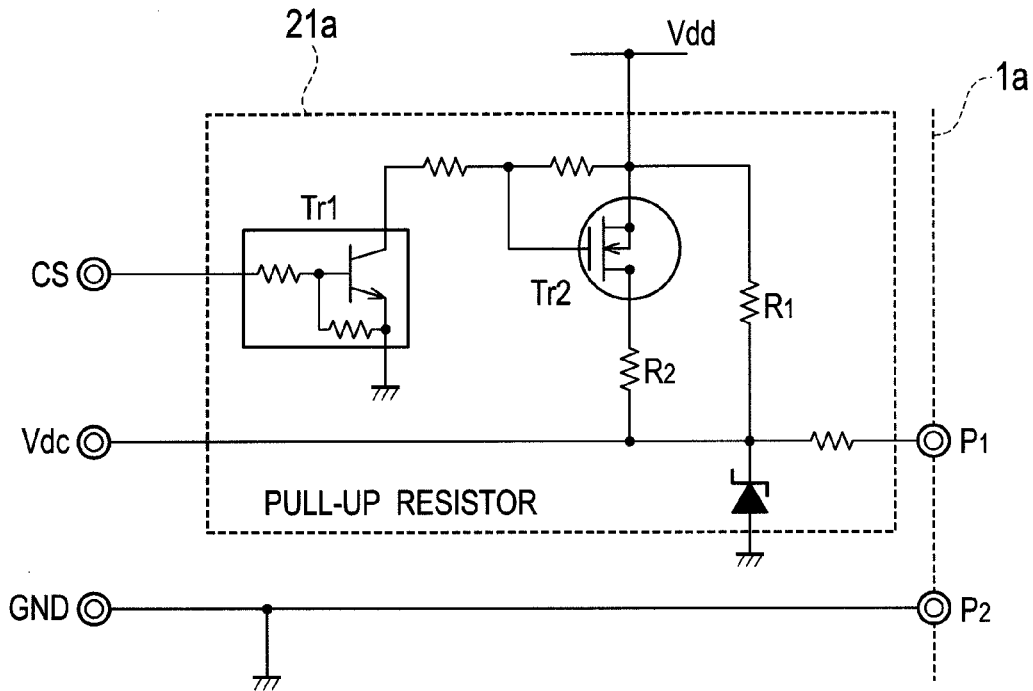
FIG. 9 is a circuit diagram of a pull-up resistor of the vehicle-mounted device according to the second embodiment.

As illustrated in FIG. 9, the pull-up resistor 21a is configured with paired pull-up resistor elements R1 and R2 and switching elements Tr1 and Tr2. The pull-up resistor elements R1 and R2 are connected in parallel between a power supply Vdd and an input port IN adapted to detect an output voltage Vdc of a steering remote control 6. The switching elements Tr1 and Tr2 are cooperative to control the current conduction of the pull-up resistor element R2.

At the pull-up resistor 21a, the switching element Tr1 is on-off controlled with a control signal CS output from the resistor control circuit 24, to control the current conduction of the pull-up resistor element R2, thus permitting the pull-up resistor 21a to have a changed resistance $R_p$.

For the pull-up resistor 21a, the number of pull-up resistor elements and the number of switching elements are not limited to two each. Each of them may be three or more. In such a case, the pull-up resistor 21a may be controlled with control signals CS output from the resistor control circuit 24, to have three or more different resistances $R_p$. There may be a pull-up resistor 21a including a continuous variable resistor. In this case also, the pull-up resistor 21a may be controlled with control signals CS output from the resistor control circuit 24, to have an arbitrarily changed resistance $R_p$.

The controller 23 is adapted to hold therein data on prescribed resistances $R_p$, and a setting for driving the resistor control circuit 24 to output control signals CS for controlling the pull-up resistor 21a to change the resistances $R_p$ to the prescribed resistances $R_p$.

It is noted that the steering remote control 6 has output terminals Q1 and Q2 thereof directly connected to input terminals P1 and P2 of the vehicle-mounted device 1a, respectively.

<Method of Determining Resistances $R_p$>

Figure 10:
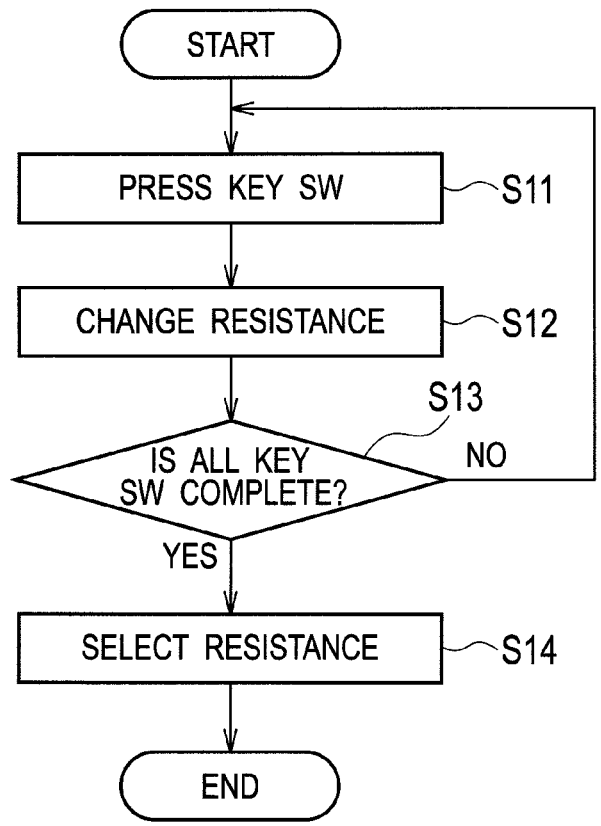
FIG. 10 is a flowchart showing a method of determining resistances of the pull-up resistor of the vehicle-mounted device according to the second embodiment.

Description is now made of a resistance determining method with reference to a flowchart in FIG. 10. This method determines a resistance $R_p$ of the pull-up resistor 21a in a registration mode.

While the steering remote control 6 is kept in an off state with no pressed key switches, the controller 23 drives the resistor control circuit 24 to output control signals CS for controlling the pull-up resistor 21a to sequentially change the resistance $R_p$ to prescribed resistances $R_p$ commensurately with the data held in the controller 23. As the resistance $R_p$ of the pull-up resistor 21a is sequentially changed, a registration processor 32 in a processor 3 of the vehicle-mounted device 1a is operated as necessary to store in a memory 4 a sequence of converted values representative of output voltages Vdc corresponding to the resistances $R_p$ when the steering remote control 6 is off.

At a step S11, the voltage detector 22 is responsive to a situation in which any key switch in the steering remote control 6 is continually pressed for a prescribed time, to enter an operation for detecting an output voltage Vdc in that situation, and output a converted value of the detected voltage Vdc to the controller 23. The controller 23 operates to determine that any key switch is pressed among SW1 to SW5 on the steering remote control 6, depending on the variation of a converted value representative of an output voltage Vdc the voltage detector 22 has detected.

At a step S12, the controller 23 drives the resistor control circuit 24 to output control signals CS for controlling the pull-up resistor 21a to sequentially change the resistance $R_p$ to prescribed resistances $R_p$ commensurately with the data held in the controller 23. As the resistance $R_p$ of the pull-up resistor 21a is sequentially changed, the registration processor 32 is operated as necessary to store in the memory 4 a sequence of converted values representative of output voltages Vdc corresponding to the resistances $R_p$ when a certain key switch is pressed on the steering remote control 6.

For instance, the controller 23 may hold therein data on two different resistances $R_{p1}$ and $R_{p2}$, and a setting for driving the resistor control circuit 24 to output control signals CS for controlling the pull-up resistor 21a to change the resistance to the two different resistances $R_{p1}$ and $R_{p2}$. Under this condition, if a key switch SW1 of the steering remote control 6 is pressed at the step S11, then the steering remote control 6 is to have two different output voltages Vdc output with respect to the key switch SW1 at the step S12.

At a step S13, the processor 3 determines whether or not the processes at the steps S11 and S12 are completed for all key switches on the steering remote control 6. If it is determined that the processes are not complete for all the key switches, the processor 3 again goes to the step S11. When the processes are determined to be complete for all the key switches, the processor 3 goes to a step S14. At the step S13, the determination above may depend on a user's operation to the touch panel 5.

At the step S14, the processor 3 prepares an output voltage list covering data on converted values representative of an output voltage Vdc of each of the key switches and an output voltage Vdc in the off state of the steering remote control 6, for each of the prescribed resistances $R_p$ held in the controller 23. The processor 3 operates on the output voltage list to select a resistance $R_p$ to be optimum for identification of a pressed key switch. Afterward, the control flow goes to an end.

For instance, the processor 3 may refer to an output voltage list thus prepared, to select the optimum resistance $R_p$ as a resistance $R_p$ for such a set of output voltages Vdc that has largest differences between neighboring voltage pairs among sets of output voltages Vdc each listing, for one of the prescribed resistances $R_p$, a combination of an output voltage Vdc in an off state and respective output voltages Vdc when any key switch is pressed. An optimum resistance $R_p$ may also be selected as being one that gives such a set of output voltages Vdc that has the largest difference between a minimum and a maximum voltage. The processor 3 also may execute a selection of resistance $R_p$ by removing one or more resistances $R_p$ that gives a set of output voltages Vdc including an output voltage Vdc in an off state and respective output voltages Vdc when any key switch is pressed, having an equal or smaller difference to or than a prescribed value between neighboring voltages.

The controller 23 has a normal mode, where it controls the pull-up resistor 21a to have a resistance $R_p$ selected by the processor 3. Under this condition, the voltage detector 22 detects an output voltage Vdc of the steering remote control 6, and the processor 3 operates to identify a key switch pressed on the steering remote control 6.

According to the second embodiment, a vehicle-mounted device is adapted to store in a memory a set of output voltages of a steering remote control, for each of key switches therein, and make identification of the key switches, allowing for facilitated operations of various steering remote controls irrespective of the car makers or the car types. Since the voltages to be detected are input from the steering remote control, there is no need to provide dedicated circuits for car makers or car types to be switched in between for detection of a voltage.

Moreover, according to the second embodiment, a vehicle-mounted device 1a has a pull-up resistor 21a variable in resistance $R_p$, permitting a voltage detector 22 to detect a voltage Vdc with good precision. Accordingly, it allows for reduced errors in identification of key switches.

Further, according to the second embodiment, a vehicle-mounted device can be free from the needs for provision of dedicated cables for car types, provision of extra measures for interrupting communications, or user's operations to switch settings, allowing for facilitated operations of various steering remote controls.

Further, according to the second embodiment, a vehicle-mounted device is adapted to freely assign a function to each of key switches on a steering remote control that may be different in configuration or key switch arrangement.

Although the present invention has been described in the form of embodiments, those discussions and drawings constituting part of the disclosure should not be construed as restrictive to the present invention. For artisan, various modes of substitute embodiments, embodiment examples, and application techniques will become apparent from the disclosure.

In the second embodiment described, the processor 3 may be adapted to operate when a key switch is pressed on the steering remote control 6 even in the normal mode, to sequentially change the resistance $R_p$ to resistances held in the controller 23, to provide corresponding sets of output voltages Vdc for use to identify key switches, in order for the precision to be enhanced in key switch identification.

The present invention may appear in various modes such as those of embodiments other than described, including applications that use the first and the second embodiments, for instance. For the present invention, the technical scope should be defined within the scope of appended claims.

What is claimed is:

1. A vehicle-mounted device comprising:
    a voltage detector comprising an input port connectable to a remote controller of a voltage dividing type adapted to output one of output voltages different from each other for each of key switches to be pressed by a user, the voltage detector being configured to detect through the input port an output voltage output from the remote controller;
    a pull-up resistor connected in series between the input port and a power supply supplying a voltage to the remote controller, the pull-up resistor having a variable resistance;
    a controller configured to control the pull-up resistor to have sequentially changed resistances in a course of pressing the key switches; and
    a processor configured to select a resistance of the pull-up resistor based on sets of output voltages given respectively for the resistances in the course of pressing the key switches, wherein
    the processor selects the resistance as a resistance of the pull-up resistor which makes a set of output voltages have largest differences between neighboring voltages in the sets of output voltages each comprising for one of the resistances a combination of an output voltage given in an off state with none of the key switches pressed and respective output voltages given for any one of the key switches.

2. The vehicle-mounted device according to claim 1, wherein the controller is responsive to a situation in which any one of the key switches is continually pressed for a prescribed time, to control the pull-up resistor to have the sequentially changed resistances.

3. The vehicle-mounted device according to claim 1, wherein
    the pull-up resistor comprises pull-up resistor elements having different resistances which are connected in parallel between the power supply and the input port, and
    the controller controls current conduction of the pull-up resistor elements to change a resistance of the pull-up resistor.

4. The vehicle-mounted device according to claim 1, further comprising:
    a display configured to display a list of functions assignable to the key switches in a function display region thereon; and
    an input interface configured to designate a function among the list of functions by a user's input operation to the function display region, wherein
    the processor is responsive to a voltage detected by the voltage detector, to assign the function to register based on a designation of the input interface, and responsive to the voltage detected by the voltage detector as input thereto, to execute the function as registered.

5. The vehicle-mounted device according to claim 4, wherein the processor is adapted to control the display to render a key switch display region which displays thereon a list of registered functions.

6. A key switch identification method comprising:
    detecting, through an input port connected to a remote controller of a voltage dividing type adapted to output one of output voltages different from each other for each of key switches to be pressed by a user, an output voltage output from the remote controller;
    controlling a pull-up resistor which is connected in series between the input port and a power supply supplying a voltage to the remote controller and has a variable resistance, to have sequentially changed resistances in a course of pressing the key switches;
    selecting a resistance of the pull-up resistor operating based on sets of output voltages given respectively for the resistances in the course of pressing the key switches; and
    identifying a pressed key switch based on an output voltage output from the remote controller under a condition that the resistance of the pull-up resistor is selected, wherein
    the selecting comprises selecting the resistance as a resistance of the pull-up resistor which makes a set of output voltages have largest differences between neighboring voltages in the sets of output voltages each comprising for one of the resistances a combination of an output voltage given in an off state with none of the key switches pressed and respective output voltages given for any one of the key switches.

7. The key switch identification method according to claim 6, wherein the controlling comprises being responsive to a situation in which any one of the key switches is continually pressed for a prescribed time, to control the pull-up resistor to have the sequentially changed resistances.

8. The key switch identification method according to claim 6, wherein the controlling comprises controlling current conduction of pull-up resistor elements having different resistances which are connected in parallel between the power supply and the input port, to change a resistance of the pull-up resistor.

9. The key switch identification method according to claim 6, further comprising:
    displaying a list of functions assignable to the key switches in a function display region on a display;
    designating a function among the list of functions by a user's input operation to the function display region; and
    being responsive to a voltage detected by the detecting, to assign the function to register based on a designation by the designating, and being responsive to the voltage detected by the detecting as input thereto, to execute the function as registered.

10. The key switch identification method according to claim 9, further comprising rendering a key switch display region on the display to display thereon a list of registered functions.

11. A vehicle-mounted device comprising:
    a voltage detector comprising an input port connectable to a remote controller of a voltage dividing type adapted to output one of output voltages different from each other for each of key switches to be pressed by a user, the voltage detector being configured to detect through the input port an output voltage output from the remote controller;
    a pull-up resistor connected in series between the input port and a power supply supplying a voltage to the remote controller, the pull-up resistor having a variable resistance;
    a controller configured to control the pull-up resistor to have sequentially changed resistances in a course of pressing the key switches; and
    a processor configured to select a resistance of the pull-up resistor based on sets of output voltages given respectively for the resistances in the course of pressing the key switches, wherein the processor selects the resistance as a resistance of the pull-up resistor which makes a set of output voltages have a largest difference between a minimum and a maximum voltage in the sets of output voltages each comprising for one of the resistances a combination of an output voltage given in an off state with none of the key switches pressed and respective output voltages given for any one of the key switches.

12. A key switch identification method comprising:

detecting, through an input port connected to a remote controller of a voltage dividing type adapted to output one of output voltages different from each other for each of key switches to be pressed by a user, an output voltage output from the remote controller;

controlling a pull-up resistor which is connected in series between the input port and a power supply supplying a voltage to the remote controller and has a variable resistance, to have sequentially changed resistances in a course of pressing the key switches;

selecting a resistance of the pull-up resistor operating based on sets of output voltages given respectively for the resistances in the course of pressing the key switches; and identifying a pressed key switch based on an output voltage output from the remote controller under a condition that the resistance of the pull-up resistor is selected, wherein the selecting comprises selecting the resistance as a resistance of the pull-up resistor which makes a set of output voltages have a largest difference between a minimum and a maximum voltage in the sets of output voltages each comprising for one of the resistances a combination of an output voltage given in an off state with none of the key switches pressed and respective output voltages given for any one of the key switches.

* * * * *